United States Patent
Albus et al.

(10) Patent No.: US 7,046,823 B2
(45) Date of Patent: May 16, 2006

(54) CORRELATION TRACKER BREAKLOCK DETECTION

(75) Inventors: John E. Albus, Granada Hills, CA (US); Julie R. Schacht, Torrance, CA (US); Grace Y. Chen, Arcadia, CA (US)

(73) Assignee: Raytheon Company, Waltham, MA (US)

( * ) Notice: Subject to any disclaimer, the term of this patent is extended or adjusted under 35 U.S.C. 154(b) by 575 days.

(21) Appl. No.: 10/210,241

(22) Filed: Aug. 1, 2002

(65) Prior Publication Data

US 2004/0022413 A1     Feb. 5, 2004

(51) Int. Cl.
*G06K 9/00* (2006.01)

(52) U.S. Cl. ............... 382/103; 382/218; 382/278; 244/3.1

(58) Field of Classification Search ........... 382/278, 382/103, 218, 219; 244/3.1, 3.17; 708/5
See application file for complete search history.

(56) References Cited

U.S. PATENT DOCUMENTS

| | | | | | |
|---|---|---|---|---|---|
| 3,943,277 | A | * | 3/1976 | Everly et al. | 348/169 |
| 3,955,046 | A | * | 5/1976 | Ingham et al. | 348/170 |
| 4,106,726 | A | * | 8/1978 | Emmons et al. | 244/3.17 |
| 4,133,004 | A | | 1/1979 | Fitts | |
| 4,164,728 | A | * | 8/1979 | Marsh | 382/193 |
| 4,244,029 | A | * | 1/1981 | Hogan et al. | 382/218 |
| 4,364,089 | A | * | 12/1982 | Woolfson | 348/169 |
| 5,245,675 | A | * | 9/1993 | Ferre et al. | 382/159 |
| 5,386,480 | A | * | 1/1995 | Lo et al. | 382/103 |
| 5,878,163 | A | * | 3/1999 | Stephan et al. | 382/172 |
| 5,947,413 | A | * | 9/1999 | Mahalanobis | 244/3.17 |
| 6,330,371 | B1 | | 12/2001 | Chen | |
| 6,337,879 | B1 | * | 1/2002 | Mihara et al. | 375/240 |

FOREIGN PATENT DOCUMENTS

EP    0 666 545 A    8/1995

OTHER PUBLICATIONS

Jahne, Book Publication, 1997, "Digital image Processing: concepts, algorithms, and scientific applications". (pp. 75-80, 383-387).*

"Developing a Real-Time, Robust, Video Tracker," K. Plakas, E. Trucco (0-7803-6551-8/00 IEEE).

(Continued)

*Primary Examiner*—Kanjibhai Patel
*Assistant Examiner*—Manav Seth
(74) *Attorney, Agent, or Firm*—John E. Gunther; Leonard A. Alkov; Karl A. Vick

(57) ABSTRACT

A system and method for detecting breaklock for correlation trackers. The inventive system includes a first circuit (50) for computing energy $E_L$ in a residual image, a second circuit (52) for computing energy $E_I$ in an input image, and a third circuit (54) for computing a residual metric $R_L$ based on the residual image energy $E_L$ scaled by the input image energy $E_I$. In the illustrative embodiment, the system further includes a fourth circuit (56) for comparing the residual metric $R_L$ to a threshold $T_R$, and a fifth circuit (58) for setting a breaklock signal based on the output of the fourth circuit (56).

11 Claims, 3 Drawing Sheets

OTHER PUBLICATIONS

Schacht, J. et al, "Implementation of an embedded image-based tracker in a distributed architecture", Proc. S.P.I.E. vol. 4714, Apr. 3, 2002, pp. 165-174.

Albus, J. E. et al, "Verification of tracker position measurement using digital video and instrumentation data recorded in flight", Proc. S.P.I.E., vol. 4714, Apr. 3, 2002, pp. 186-195.

Plakas K. et al, "Developing a real-time, robust, video tracker", Oceans 2000 MTS/IEEE Conf. and Exhibition, Sep. 11, 2000, pp. 1345-1352, vol. 2.

* cited by examiner

CORRELATION TRACKER BREAKLOCK DETECTION

RIGHTS IN INVENTION

This invention was made with support under Government Subcontract No. E80011 Boeing Corp. under Prime Contract N00019-97-C-0009 with the Department of the Navy. The U. S. Government may have certain rights to this invention.

BACKGROUND OF THE INVENTION

1. Field of the Invention

The present invention relates to imaging systems. More specifically, the present invention relates to correlation based imaging target trackers.

2. Description of the Related Art

An autotracker is a device which locates a target in each of a sequence of images and generates commands to maintain a sensor line-of-sight on the target. Correlation trackers generate servo commands based on the position of the target. The tracker measures this position by finding the shift of the input image that maximizes its cross-correlation with a reference image formed by averaging recent past input images.

During a target tracking operation, it often happens that the line-of-sight from the sensor to the target becomes temporarily obscured. For example, in an air-to-ground scenario, a cloud or a building may pass between the sensor and the target temporarily blocking the line-of-sight. One important function of the autotracker is to determine when the target has been obscured, thereby detecting a 'breaklock' condition. The tracker is then commanded into a 'coast mode' until the target is again visible. In coast mode the sensor is pointed open-loop at the predicted position of the target based on its recent motion. While in coast mode the tracker must continually monitor the input image to determine when the target is again visible so that closed-loop tracking may resume.

Prior attempts to detect breaklock made use of either: 1) a threshold on a statistical average of the residuals after cross-correlation (see, for example, "Developing a Real-Time, Robust, Video Tracker," K. Plakas, E. Trucco (0-7803-6551-8/00 IEEE) or 2) a threshold on the change in the difference between the input image and the correlation reference map. Unfortunately, these approaches have proven to be too sensitive to certain image disturbances which commonly occur in dynamic tracking situations. This is due to the reliance by these approaches on an assumption that the difference between the input image and reference map pixel values has a Gaussian density. While this may be true in an idealized situation, in practical tracking situations there are several types of image disturbances which cause the Gaussian assumption to falter. One such disturbance is due to a change of the sensor position relative to the tracked target which causes the target's image to change in size and shape. Another is due to uncommanded sensor line-of-sight deviations such as jitter which cause image blurring. These image disturbances will cause the existing breaklock detection methods to falsely declare a breaklock condition when continued tracking is still feasible.

Hence, a need exists in the art for an improved system or method for detecting breaklock for correlation trackers.

SUMMARY OF THE INVENTION

The need in the art is addressed by the system and method for detecting breaklock for correlation trackers of the present invention. The inventive system includes a first circuit for computing energy $E_L$ in a residual image, a second circuit for computing energy $E_I$ in an input image, and a third circuit for computing a residual metric $R_L$ based on the residual image energy $E_L$ scaled by the input image energy $E_I$.

In the illustrative embodiment, the system further includes a fourth circuit for comparing the residual metric $R_L$ to a threshold $T_R$, and a fifth circuit for setting a breaklock signal based on the output of the fourth circuit.

The present invention addresses the problems associated with the prior art by comparing the residual energy to the energy in the input image, rather than the current method of comparing the residual energy to an absolute threshold. By scaling the residual energy by the input image energy, a more robust statistic is obtained which allows closed-loop tracking to continue as long as even a small amount of match exists between the input and reference images. The invention has been designed to quickly and accurately determine actual breaklock conditions such as obscurations and extreme uncommanded line-of-sight deviations while enabling continued tracking through high sensor-to-target relative position rates and sensor line-of-sight jitter.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
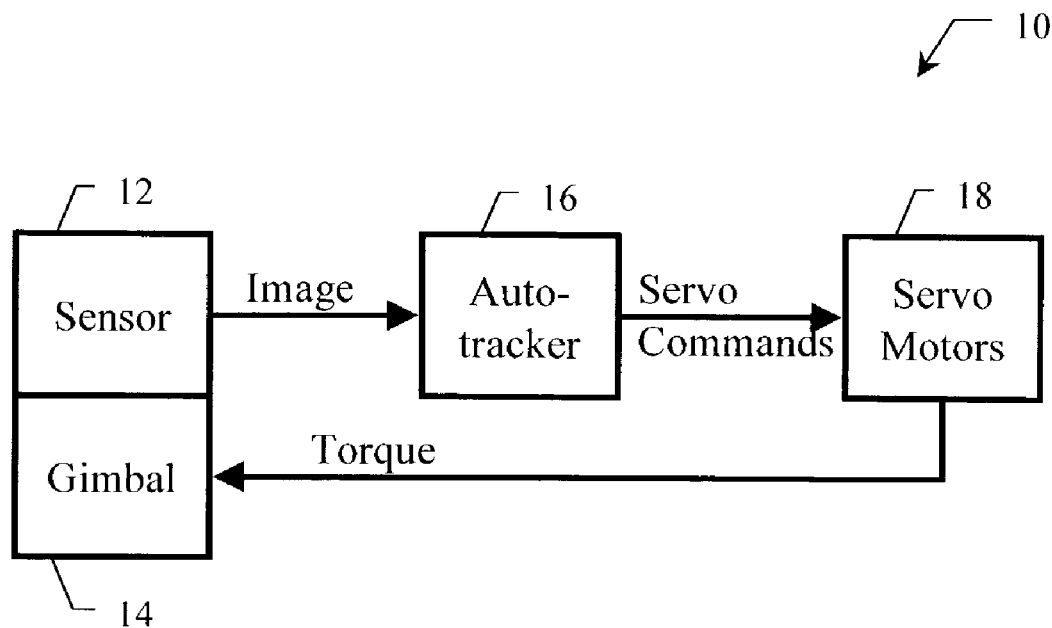
FIG. 1 is a block diagram of an autotracker system.

FIG. 1 is a block diagram of an autotracker system 10. A monochromatic sensor 12, mounted in a gimbal 14 generates a two dimensional image, I(r,c), of the target. Example sensors are an infrared (IR) sensor or a TV camera. This image is processed by the autotracker 16, which generates commands to the servo motors 18 to maintain the sensor line-of-sight on the target. In a correlation tracker, the position of the target is measured by finding the shift of the input image that maximizes its cross-correlation with a reference image formed by averaging recent past input images.

The present invention is a system and method for breaklock detection for use in correlation autotracker systems. It uses statistics generated by the correlation process to compute a residual metric that is used to determine, while tracking, when the target is no longer present in the field of view, and, while coasting, when the target is again visible in the field of view. The invention addresses the problems of the prior art by comparing the residual energy to the energy in the input image, rather than the current method of comparing the residual energy to an absolute threshold. By scaling the residual energy by the input image energy, a more robust statistic is obtained which allows closed-loop tracking to continue as long as even a small amount of match exists between the input and reference images. The invention has been designed to quickly and accurately determine actual breaklock conditions such as obscurations and extreme uncommanded line-of-sight deviations while enabling continued tracking through high sensor-to-target relative position rates and sensor line-of-sight jitter.

Figure 2:
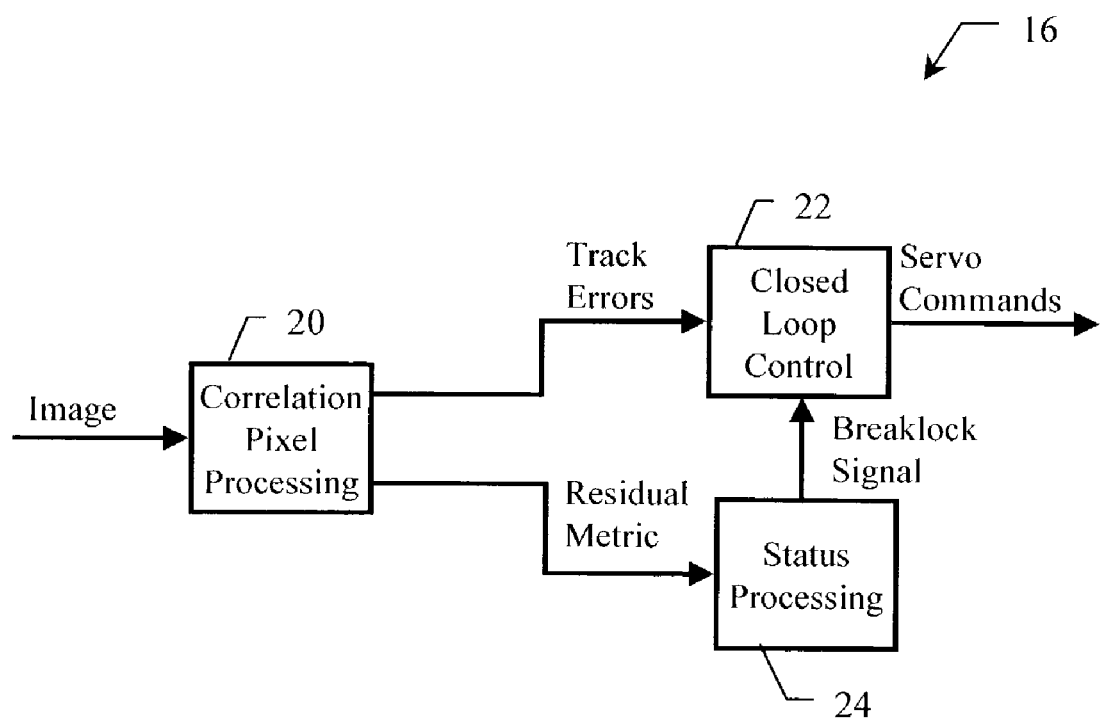
FIG. 2 is a block diagram of the components of an autotracker designed in accordance with the teachings of the present invention.

FIG. 2 is a block diagram of the components of an autotracker 16 designed in accordance with the teachings of the present invention. A correlation pixel processing function 20 maintains a reference map and cross-correlates this map with each input image to determine the track errors and a residual metric. The track errors are used by the closed-loop control function 22 to compute servo commands to keep the tracked target in the center of the sensor field of view. The residual metric, the subject of this patent, is used by status processing 24 to derive a breaklock signal. This breaklock signal is used by the closed-loop control function 22 to determine when it should point the sensor based on the track errors (closed-loop mode) or when it should ignore the track errors and point using the predicted target position (coast mode).

While this method can be applied to any correlation tracker, the invention will now be described with reference to an illustrative application to the Fitts correlation pixel processing algorithm described in U.S. Pat. No. 4,133,004, issued Jan. 2, 1979, entitled "Video Correlation Tracker", the teachings of which are incorporated herein by reference. In accordance with the Fitts teachings, a correlation pixel processing algorithm generates a reference map, denoted $M(r,c)$, in pixel format by averaging input images prior to the current time t. (It is assumed herein that all images mentioned have $N_{rows}$ rows and $N_{cols}$ columns of pixels for a total of $N_{pixels} = N_{rows} * N_{cols}$ pixels. Thus, the row numbers r, have values in the range from 1 to $N_{rows}$ inclusive, and the column numbers, c, have values in the range from 1 to $N_{cols}$ inclusive.)

The correlation pixel processing 20 correlates the reference map $M(r,c)$ with the input image at time t, denoted $I(r,c)$, to determine the track error, denoted $$\delta = \begin{bmatrix} \delta_r \\ \delta_c \end{bmatrix},$$

which is the estimated shift of the input image relative to the reference image. As described in the Fitts correlation patent, in the process of computing the track error the Fitts algorithm computes gradient images that are approximations to the image spatial derivatives in the row and column directions. The gradient image in the row direction, denoted $G_r(r,c)$, is given by:

$$G_r(r, c) = \frac{M(r+1, c) - M(r-1, c)}{2} \quad [1]$$

and the gradient image in the column direction, denoted $G_c(r,c)$ is given by:

$$G_c(r, c) = \frac{M(r, c+1) - M(r, c-1)}{2} \quad [2]$$

The residual image, denoted $L(r,c)$, is defined to be the difference between the input image and the reference map shifted by $\delta'$, where $$\delta' = \begin{bmatrix} \delta'_r \\ \delta'_c \end{bmatrix}$$

is the computed track error before drift compensation, as described in the Fitts algorithm patent. The shifted reference map, denoted $M'(r,c)$, may be approximated using a first order Taylor expansion by:

$$M'(r,c) = M(r,c) + G_r(r,c)\delta'_r + G_c(r,c)\delta'_c \quad [3]$$

Thus, the residual image can be approximated by:

$$L(r,c) = I(r,c) - M'(r,c) = I(r,c) - M(r,c) - G_r(r,c)\delta'_r - G_c(r,c)\delta'_c, \quad [4]$$

or $$L(r,c) = D(r,c) - G_r(r,c)\delta'_r - G_c(r,c)\delta'_c \quad [5]$$

where $D(r,c)$ is the difference image defined by:

$$D(r,c) = I(r,c) - M(r,c) \quad [6]$$

The energy in the residual image, denoted $E_L$, gives an indication of the relative amount of unexplained variation in the residual image, and is defined as:

$$E_L = \sum_{(r,c) \in Gate} (L(r, c) - \bar{L})^2, \quad [7]$$

where $\bar{L}$ is the average of the residual image pixel values given by:

$$\bar{L} = \frac{1}{N_{pixels}} \cdot \sum_{(r,c) \in Gate} L(r, c) \quad [8]$$

and Gate represents the set of (r,c) values for which $1 \leq r \leq N_{rows}$ and $1 \leq c \leq N_{cols}$.

Similarly, the energy in the input image, denoted $E_I$, is defined to be:

$$E_I = \sum_{(r,c) \in Gate} (I(r, c) - \bar{I})^2, \quad [9]$$

where $\bar{I}$ is the average of the input image pixel values and is given by:

$$\bar{I} = \frac{1}{N_{pixels}} \cdot \sum_{(r,c)\in Gate} I(r,c) \quad [10]$$

The residual metric, denoted $R_L$, is then defined to be:

$$R_L = \frac{E_L}{E_I} \quad [11]$$

and represents the relative amount of the energy in the input image that is not explained by modeling it as the shifted reference image.

In practice the energy in the residual image can be approximated by the energy in the difference image because the image shifts are relatively small, and the change they induce can often be neglected. Let the energy in the difference image, denoted $E_D$, be defined as:

$$E_D = \sum_{(r,c)\in Gate} (D(r,c) - \bar{D})^2 \quad [12]$$

where $\bar{D}$ is the average of the difference image pixel values given by:

$$\bar{D} = \frac{1}{N_{pixels}} \cdot \sum_{(r,c)\in Gate} D(r,c) \quad [13]$$

The difference residual metric, denoted $R_D$, is then defined to be:

$$R_D = \frac{E_D}{E_I} \quad [14]$$

The residual metric, either $R_D$ or $R_L$, is used by the status processing function 24 to determine the value of the breaklock signal. If the shifted reference image exactly matches the input image then the residual metric will very nearly equal zero. As the degree of match decreases the residual metric grows in size. Values of this metric close to or greater than one indicate a complete mismatch between the reference image and the input image. Therefore, a threshold, $T_R$, on the residual metric is used to derive the breaklock signal. If the residual metric is less than or equal to $T_R$, the match between the reference image and the input image is considered good enough to continue tracking and the breaklock signal is set to FALSE indicating that closed-loop tracking is to continue. If the residual metric is greater than $T_R$, then the match has significantly degraded and the breaklock signal is set to TRUE indicating that the closed-loop control should enter coast mode. Empirical experience has shown that tracking can reliably continue with $T_R$ values up to 0.9.

Figure 3:
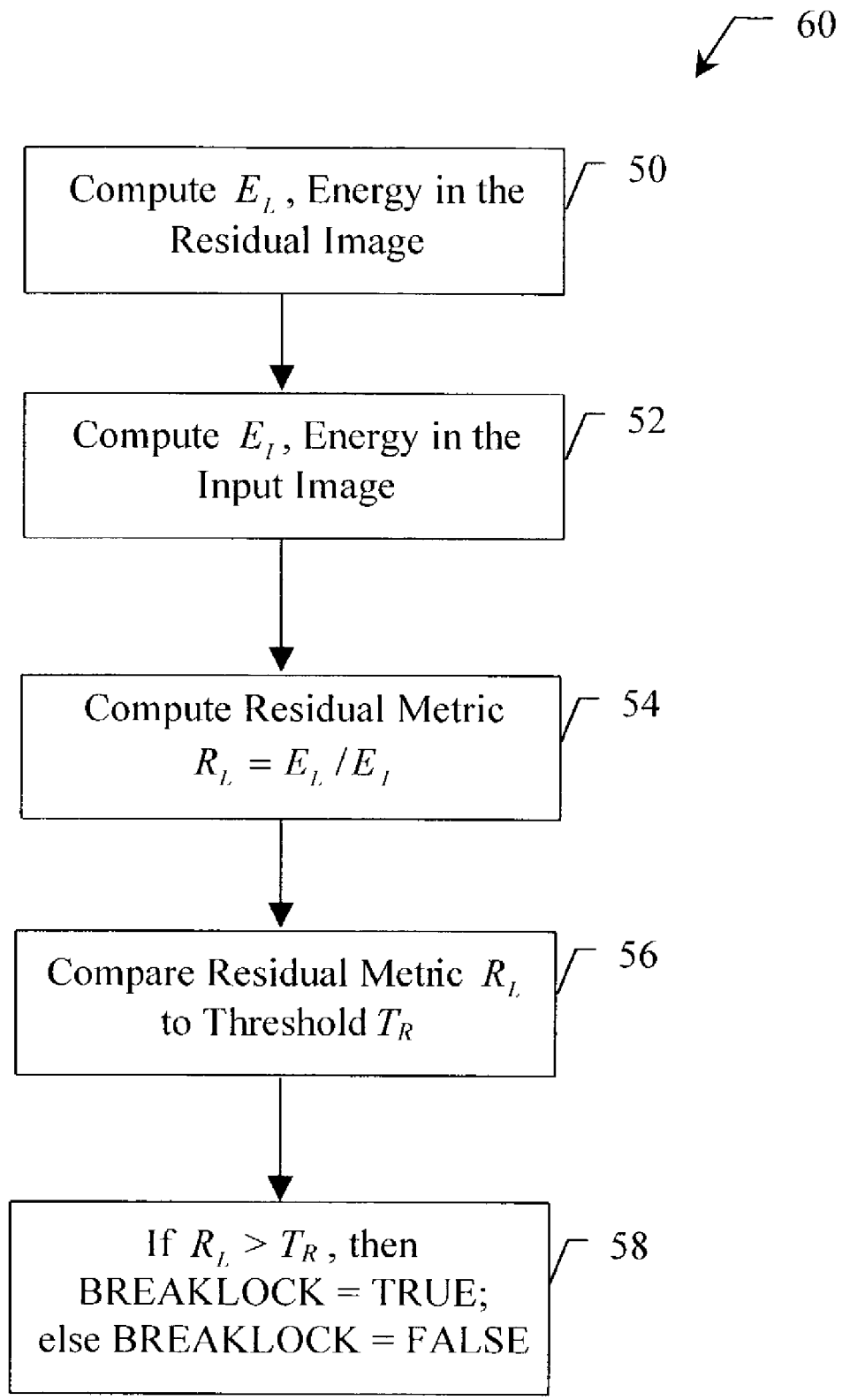
FIG. 3 is a flow chart illustrating the breaklock detection method of the present invention.

FIG. 3 is a flow chart illustrating the breaklock detection method 60 of the present invention. First, the energy $E_L$ in the residual image is determined (50), and the energy $E_I$ in the input image is determined (52). In the illustrative embodiment, $E_L$ is computed using Eqn. 7, or estimated using Eqn. 12. In the illustrative embodiment, $E_I$ is computed using Eqn. 9. Next, the residual metric $R_L = E_L/E_I$ is computed (54). Then, the residual metric $R_L$ is compared to a threshold $T_R$ (56). Finally, if the residual metric $R_L$ was greater than the threshold $T_R$, then the Breaklock Signal is set to TRUE; otherwise, it is set to FALSE (58).

Figure 4:
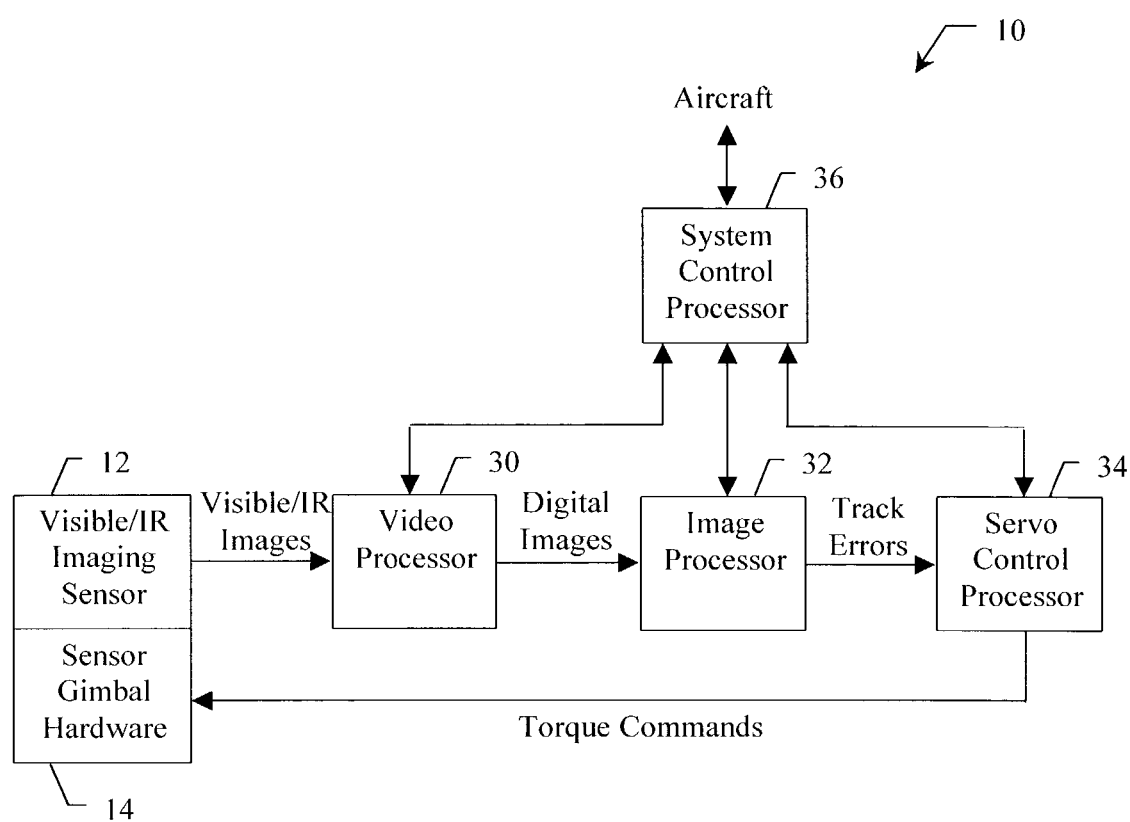
FIG. 4 is a block diagram showing a hardware implementation of the autotracker system of the present invention.

FIG. 4 is a block diagram showing a hardware implementation of the autotracker system 10 of the present invention. A sensor 12 mounted in a gimbal 14 receives visible or infrared images which are then processed by a video processor 30. The video processor 30 formats the received images into digital video and, for infrared, performs non-uniformity correction and dead cell replacement. The digital images are then sent to an image processor 32 which computes the track errors and the residual metric. The track errors are used by a servo control processor 34 to generate the torque commands for the sensor gimbal hardware 14 to keep the tracked target in the center of the sensor field of view. The residual metric is used by a system control processor 36 to derive a breaklock signal. This breaklock signal is used by the servo control processor 34 to determine when it should point the sensor based on the track errors (closed-loop mode) or when it should ignore the track errors and point using the predicted target position (coast mode). The system control processor 36 controls the operation of the entire autotracker system and may interface to an aircraft.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for detecting breaklock for correlation trackers comprising:
    first means for computing energy $E_L$ in a residual image;
    second means for computing energy $E_I$ in an input image; and
    third means for computing a residual metric R L based on the residual image energy $E_L$ scaled by the input image energy $E_I$.

2. The system of claim 1 wherein said system further includes fourth means for comparing said residual metric $R_L$ to a threshold $T_R$.

3. The system of claim 2 wherein said system further includes fifth means for setting a breaklock signal based on the output of said fourth means.

4. The system of claim 2 wherein said breaklock signal is set to TRUE if the residual metric $R_L$ is greater than the threshold $T_R$ and FALSE otherwise.

5. The system of claim 1 wherein said residual image energy $E_L$ is computed using the equation $$E_L = \sum_{(r,c)\in Gate} (L(r,c) - \bar{L})^2,$$

where L(r,c) is the residual image, $\bar{L}$ is the average of the residual image pixel values, and Gate represents the set of (r,c) values in the image.

6. The system of claim 1 wherein said residual image energy $E_L$ is approximated by the energy $E_D$ in a difference image D(r,c).

7. The system of claim 6 wherein said difference image energy $E_D$ is computed using the equation $$E_D = \sum_{(r,c) \in Gate} (D(r,c) - \overline{D})^2,$$

where $\overline{D}$ is the average of the difference image pixel values, and Gate represents the set of (r,c) values in the image.

8. The system of claim 1 wherein said input image energy $E_I$ is computed using the equation $$E_I = \sum_{(r,c) \in Gate} (I(r,c) - \overline{I})^2,$$

where I(r,c) is the input image, $\overline{I}$ is the average of the input image pixel values, and Gate represents the set of (r,c) values in the image.

9. The system of claim 1 wherein said residual metric $R_L$ is computed using the equation $R_L = E_L/E_I$.

10. An autotracking system comprising:
a sensor mounted on a gimbal for receiving an input image;
an image processor which computes track errors, and a residual metric $R_L$ based on a residual image energy $E_L$ scaled by an input image energy $E_I$;
a servo control processor which computes commands for the sensor gimbal based on the track errors; and
a system control processor which generates a breaklock signal for the servo control processor based on the residual metric $R_L$.

11. A method for detecting breaklock for correlation trackers including the steps of:
computing the energy $E_L$ in a residual image;
computing the energy $E_I$ in an input image;
computing a residual metric $R_L$ based on the residual image energy $E_L$ scaled by the input image energy $E_I$;
comparing said residual metric $R_L$ to a threshold $T_R$; and
setting a breaklock signal based on said comparison.

* * * * *